US011579952B2

(12) United States Patent
Ozonat et al.

(10) Patent No.: US 11,579,952 B2
(45) Date of Patent: Feb. 14, 2023

(54) MACHINE-LEARNING BASED OPTIMIZATION OF DATA CENTER DESIGNS AND RISKS

(71) Applicant: HEWLETT PACKARD ENTERPRISE DEVELOPMENT LP, Houston, TX (US)

(72) Inventors: Mehmet Kivanc Ozonat, San Jose, CA (US); Tahir Cader, Liberty Lake, WA (US); Matthew Richard Slaby, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 776 days.

(21) Appl. No.: 16/399,861

(22) Filed: Apr. 30, 2019

(65) Prior Publication Data
US 2020/0348993 A1    Nov. 5, 2020

(51) Int. Cl.
| G06F 11/00 | (2006.01) |
| G06F 1/20 | (2006.01) |
| G06K 9/62 | (2022.01) |
| G06F 16/901 | (2019.01) |
| G06N 3/04 | (2023.01) |
| G06F 1/28 | (2006.01) |
| G06N 3/10 | (2006.01) |

(52) U.S. Cl.
CPC ............ *G06F 11/008* (2013.01); *G06F 1/206* (2013.01); *G06F 1/28* (2013.01); *G06F 16/9024* (2019.01); *G06K 9/6256* (2013.01); *G06N 3/04* (2013.01); *G06N 3/10* (2013.01)

(58) Field of Classification Search
CPC .......... G06F 11/008; G06F 1/206; G06F 1/28; G06F 16/9024; G06K 9/6256; G06K 9/6296; G06N 3/04; G06N 3/10; G06N 3/0472; G06N 3/08
USPC .......................................................... 706/19
See application file for complete search history.

(56) References Cited

U.S. PATENT DOCUMENTS

| 6,381,504 B1 * | 4/2002 | Havener ................ G05B 17/02 700/28 |
| 2020/0102902 A1 * | 4/2020 | Piche ...................... F23N 5/265 |

OTHER PUBLICATIONS

Wang, C., Talwar, V., Schwan, K. and Ranganathan, P., Apr. 2010. Online detection of utility cloud anomalies using metric distributions. In 2010 IEEE Network Operations and Management Symposium-NOMS 2010 (pp. 96-103). IEEE.*

* cited by examiner

Primary Examiner — Neil R McLean
(74) Attorney, Agent, or Firm — Hewlett Packard Enterprise Patent Department

(57) ABSTRACT

In exemplary aspects of optimizing data centers, historical data corresponding to a data center is collected. The data center includes a plurality of systems. A data center representation is generated. The data center representation can be one or more of a schematic and a collection of data from among the historical data. The data center representation is encoded into a neural network model. The neural network model is trained using at least a portion of the historical data. The trained model is deployed using a first set of inputs, causing the model to generate one or more output values for managing or optimizing the data center with respect to design and risk aspects.

17 Claims, 9 Drawing Sheets

MACHINE-LEARNING BASED OPTIMIZATION OF DATA CENTER DESIGNS AND RISKS

BACKGROUND

Data centers are highly complex systems that consist of a number of critical subsystems, including power distribution units (PDUs), pumps, blowers, controllers, cooling towers (CTs), among others. In recent years, data centers have been increasingly instrumented with a large number of sensors, generating massive amounts of data, in an effort to optimize the data centers, improve efficiencies, minimize downtimes, and reduce power consumption.

BRIEF DESCRIPTION OF THE DRAWINGS

Certain examples are described in the following detailed description and in reference to the drawings, in which.

DETAILED DESCRIPTION

Figure 1:
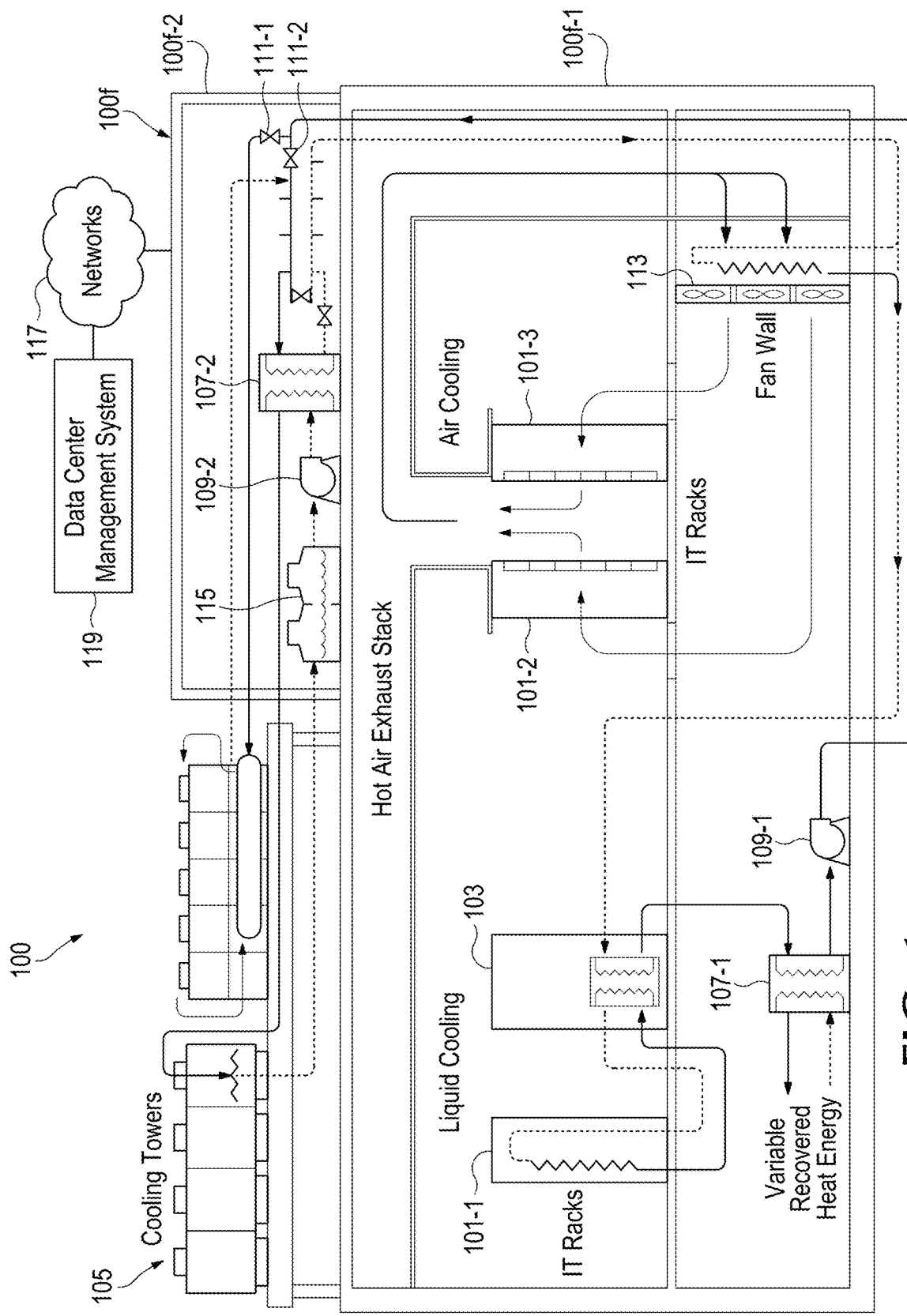
FIG. 1 is a system diagram illustrating a data center according to an exemplary embodiment.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

Today's data center design process relies on a delicate combination of engineering and experience. If too much engineering is used in the data center design, the cost to the owner increases, and the process is slowed down. As a result, seasoned data center designers balance the use of engineering and experience, to achieve goals such as: designing fail safe and resilient data centers, with minimal risk of failures; achieving a low cost, and achieving power and thermal efficiency.

Data centers are designed using traditional structural, power systems, and cooling systems modeling and design approaches. For example, for power systems, designers rely heavily on specification sheets provided by manufacturers for subsystems such as generators, transformers, uninterruptible power supplies (UPSs), switchgear, and the like. The specifications are then analyzed in relation to the desired overall data center power consumption target, redundancy requirements, power quality requirements, and the like.

Data centers are highly complex systems that consist of multiple critical subsystems. Examples of subsystems include power distribution units (PDUs), pumps, blowers, controllers, cooling towers, and the like. A failure of any of the critical subsystems could result in a costly shutdown of the data center. Each subsystem in turn relies on sensors to monitor its health. The health of the subsystems is monitored by things such as rack and row management systems for IT racks, building management systems (BMSs) for cooling subsystems, or power supervisory control and data acquisition (SCADA) systems for power subsystems. Given the critical nature of all the subsystems, intelligent design and risk management for the data center are highly important.

Moreover, the addition of large numbers of sensors and the associated massive amounts of data collected from the sensors, has made the ability for humans to manage all the data while simultaneously extracting valuable insights in real-time extremely difficult, if not impossible. For example, today, anomalies are detected when a data center operator identifies that the output of a given sensor is above or below the threshold value set for that sensor. The operator has to track hundreds to thousands of sensors that are used in the data center. Moreover, false positives and negatives (e.g., when a sensor value spikes above or below the threshold value) for one or more sensors can occur and complicate the job of the data center operator. And, sensor based management requires the existence of sensors at systems and sub-systems in order to detect anomalies and failures therein.

Accordingly, the example embodiments described herein provide for using machine learning, neural networks and deep learning to create models that are used to design data centers, enhance risk management, and pinpointing failures, including for uninstrumented parts of the data center. Notably, the example embodiments described herein allow for the detection of anomalies in data centers even when individual or even groups of systems, sub-systems, sensors, and the like are not anomalous or failing.

Data Center

FIG. 1 is a system diagram illustrating a data center 100 according to exemplary embodiments. As used herein, a data center can refer to a site or location that includes systems, sub-systems, devices, components, mechanisms, and the like (collectively referred to herein as "systems and sub-systems"), including computing systems and sub-systems (collectively referred to herein as "computing systems") having computing resources that are accessible by consumers via corresponding systems and devices. The data center can be or include facilities such as buildings, rooms and the like, in which systems and sub-systems of the data center can be housed. It should be understood, however, that some of the systems and sub-systems of data centers can be housed external to the facilities. Moreover, it should be understood that data centers and/or facilities can be fixed or movable.

As shown in FIG. 1, the data center 100 includes a facility 100$f$, which can be a building or the like that includes spaces 100$f$-1 and 100$f$-2 (collectively referred to as "100$f$" or "spaces "100$f$"). The spaces 100$f$ can be rooms, areas, or subsections of the facility 100$f$. For purposes of illustration, FIG. 1 illustrates the facility 100$f$ including or housing racks (or "IT (information technology) racks") 101-1, 101-2 and 101-3 (collectively referred to as "101" or "racks 101"). It should be understood that the data center 100 and/or the facility 100f can include any number of racks. Moreover, each of the racks 101 can refer to one or any number of racks.

The racks 101 are configured to house computing systems such as computers, servers, monitors, hard drives, disk drives, memories, mass storage devices, processors, microcontrollers, high-speed video cards, semi-conductor devices, printed circuit boards (PCBs), power supplies and the like, as known to those of skill in the art. The computing systems of the racks 101 can be configured to execute a variety of operations, including computing, storage, switching, routing, cloud solutions, and others. It should be understood that each of the racks 101 can include any number or types of computing systems for performing any number or types of operations.

As known to those of skill in the art, the use or functioning of the computing systems of the racks 101 cause substantial amounts of heat to be dissipated therefrom throughout the facility 100f and beyond. To manage the heat dissipated from the computing systems of the racks, data centers and facilities can include cooling systems and mechanisms. It should be understood that the cooling systems of data centers and facilities can be configured in many ways and with a variety of passive or active systems and sub-systems known to those of skill in the art. Systems and sub-systems for managing the data center and cooling thereof can include cooling distribution units (CDUs), cooling towers, power components that provide and/or control the power and cooling within the data center 100 and/or the facility, temperature components, fluid control components, chillers, heat exchangers ("HXs" or "HEXs"), computer room air handlers (CRAHs), humidification and dehumidification systems, blowers, pumps, valves, power systems for supplying power (e.g., uninterruptible power supplies (UPSs)), generators, transformers, switchgear and the like, as known to those of skill in the art.

Nonetheless, for purposes of illustration, cooling of the data center 100 including the facility 100f of FIG. 1 is described herein with reference to an exemplary embodiment that employs, among other systems and sub-systems described herein, CDUs 103 and cooling towers 105. As shown in FIG. 1, the CDUs 103 can be housed within the facility 100f, and the cooling towers 105 can be provided outdoors and external to the facility 100f. In some embodiments, cooling is achieved by controlling or managing the flow of coolants, which can be liquid or fluid coolants such as water, and/or air coolants. The coolant flows can form or include multiple loops. For example, the liquid flow of FIG. 1 can include a primary loop and a secondary loop. The primary loop refers to the flow loop between the CDUs 103 and the cooling towers 105, while the secondary loop refers to the flow loop between the CDUs 103 and the racks 101. In some embodiments, among other things, coolant can absorb heat or heat energy from a source and/or location (e.g., at or proximate to the racks 101), in the secondary loop; and the liquid can dissipate and transport heat or heat energy to another source or location (e.g., at or proximate to the cooling towers 105) in the primary loop.

More specifically, as shown in FIG. 1, cold or cooled liquid can be housed or contained in sump tanks 115, or similar containers, which are housed in the facility 100f, but which can be housed externally thereto. The liquid is transferred through pipes or similar mechanisms. In some embodiments, the liquid is transferred from sump tanks 115 to the HX (or cooling tower HX) 107-2, employing the pump 109-2 as needed to control the rate of flow of the liquid. The cooled liquid can be transferred from the HX 107-2 toward the CDUs 103. In some embodiments, valves can be employed therebetween to control the amount of liquid flowing from the HX 107-2 to the CDUs 103. Moreover, in some embodiments, heat or heated liquid can be removed from or transferred out of the cooled liquid output by the HX 107-2 and, employing a valve or the like, added to return liquid and recirculated into the HX 107-2.

The cooled liquid transmitted from the HX 107-2 is transmitted to and received by the CDUs 103. The CDUs 103 can be configured to manage one or more loops of coolant therethrough and, among other things, control the temperature and flow of the coolant to achieve desired cooling and/or flow. Each of the CDUs 103 can include sub-systems (including mechanisms, parts, components, devices, etc.) therein, such as controllers (e.g., controllers, displays), valves (e.g., control valves, isolation valves, suction devices, mechanical devices, one-way valves, two-way valves), pumps (e.g., engines, motors, suction pumps, or other type of variable speed pumps that can increase or decrease speed to increase or decrease the differential pressure across the pump), heat exchangers, tanks, and others known to those of skill in the art. For example, in some embodiments, the CDUs 103 employ valves that can regulate, direct and/or control the coolant flow. The coolant flow can be detected based on the position of the valves and regulated by partially or fully opening or closing the valves. In some embodiments, the CUDs 103 can include facility side valves for controlling flow to and from the cooling towers 105 (and/or HX 107-2), and rack side valves for controlling flow to and from the racks 101.

The coolant liquid is output from the CDUs 103 to or toward the racks 101 where it absorbs the heat dissipated by the racks 101-1, thereby heating the liquid. The heated liquid from the racks 101-1 is circulated back into the CDUs 103, and therefrom, transmitted to the HX 107-1. The HX 107-1 can remove heat from the heated liquid and employ that heat or heat energy for other purposes, such as heating of different parts of the facility 100f. Cool liquid can be removed or obtained from the heated liquid output by the HX 107-1, and can in turn be recirculated through the HX 107-1 and output as heated liquid. The heated liquid is in turn transmitted toward the HX 107-2. In some embodiments, a pump such as the pump 109-1 can be employed to control the flow rate of the heated liquid from the HX 107-1 to the HX 107-2.

The HX 107-2 can process the received heated liquid and remove heat therefrom, thereby cooling the liquid. That is, the liquid on the facility side of the HX 107-2 fully transfers the desired heat into the loop on the cooling tower 105 side. The HX 107-2 therefore can isolate the cleaner facility water from the dirtier cooling tower loop. It should be understood that, at the HX 107-2 (and/or at any HX in general), the heat that needs to be or is desired to be transferred across the HX is typically transferred. The amount of heat transferred can be controlled via the flow rate, set-point temperature and the like. The liquid is transmitted to the cooling towers 105, where it can be further cooled, and water vapor created therein can be exhausted into the open air. In some embodiments, the cooling towers 105 can be closed loop cooling towers that contain all liquid, such that no water vapor is generated. In such cases, the HX 107-2 can optionally be removed from the system. Moreover, in some embodiments, the cooling towers 105 can include fans to cause ambient airflow to pass therethrough and/or pumps (e.g., in evaporatively cooled cooling towers) to drive water which is in turn sprayed over the cooling tower HX or to cool the cooling tower's water loop. In some embodiments, valves such as valve 111-1 (e.g., HX bypass valve) and 111-2 (e.g., facility valve) can be employed to control the flow of liquid.

In some embodiments, the data center 100 can also perform cooling of the racks 101-2 and 101-3 using air cooling systems, sub-systems and techniques. As shown in FIG. 1, the facility 100f can include a fan wall 113 including any number of fans. The fans take in heated air released by the racks 101-2 and 101-3 into a hot air exhaust stack, and blow out cooler or cooled air toward the racks 101-2 and 101-3. The cooled air blown out by the fan wall can cool the racks 101-2 and 101-3, and the area thereabout. Dissipated hot air is again circulated through the exhaust stack and back through the fan wall 100. In some embodiments, as shown in FIG. 1, the cooled liquid transmitted from the cooling towers 105 toward the CDUs 103 is run through or proximate to the hot air exhaust stack, such that it can absorb heat from the hot air and provide cooler air as intake for the fan wall 113.

Although not illustrated herein, in some embodiments, systems and sub-systems of the data center 100 can include and/or be communicatively coupled to controllers for monitoring and/or managing their operation. The controllers can be or include computing devices or components such as microprocessors, microcontrollers, application specific integrated circuits (ASICs), central processing units (CPUs), graphics processing units (GPUs), systems on a chip (SoCs), quantum processors, chemical processors or other processors, known to those of skill in the art, hardware state machines, hardware sequencers, digital signal processors (DSPs), field programmable gate array (FPGA) or other programmable logic device, gate, or transistor logic, or any combination thereof. The controllers can also include one or more memory or storage devices such as read-only memory (ROM), Random Access Memory (RAM), electrically erasable programmable ROM (EEPROM)), flash memory, registers or any other form of storage medium known to those of skill in the art. The memory or storage device can execute instructions or logic for, among other things, controlling corresponding system or sub-systems. For example, in some embodiments, the CDUs 103 can be equipped with a controller that can execute instructions causing opening or closing or a valve therein.

In some embodiments, systems and sub-systems of the data center 100 can be communicatively coupled to one or more networks 117, which can be wired and/or wireless (e.g., the Internet, local area network (LAN), wide area network (WAN), virtual private network (VPN), enterprise private network (EPN)). The systems and sub-systems can communicate through the networks 117, for example, via their respective controllers. The networks 117 can enable the systems and/or sub-systems of the data center to communicate with systems such as management and/or monitoring systems, which can be provided at the facility 100f, data center 100 and/or remotely. In some embodiments, these can include rack and row management systems for managing the racks 101, building management systems (BMSs) for managing cooling systems and subsystems (e.g., CDUs 103), power SCADA systems for managing power subsystems, and the like.

In some embodiments, systems and sub-systems of the data center 100 can be communicatively coupled to a data center management system 119, via the networks 117. As described in further detail below, the data center management system 119 can be configured to, among other things, analyze performance of the data center 100, identify failures, and the like. The data center management system can include processors, memories and communication means, as described herein and known to those of skill in the art, that are configured to perform the functions described herein, including modeling a data center and running optimizations and simulations therewith.

Although not illustrated in FIG. 1, the data center 100 and facility 100f, including the systems and sub-systems therein, can be "instrumented," meaning that they are equipped with sensors. The sensors can include environmental sensors and on-device sensors. The environmental sensors can be provided throughout (e.g., internally and externally) the data center 100 or facility 100f and provide information relative to their positioning or location therein. The on-device sensors are associated with (e.g., physically attached thereto) specific systems or sub-systems and provide information relative to those systems or sub-systems. For example, environmental sensors can include sensors for measuring and outputting data relating to the internal or external conditions of the data center 100 or facility 100f, such as temperature, humidity, pressure, airflow, light, water, smoke, voltage, location, power, flow rates, doors, video, audio, speed, and others known to those of skill in the art. The sensors are configured to transmit data via one or more wired or wireless networks (e.g., networks 117) or protocols, such as ZigBee, Zwave, Bluetooth, radio frequency identification (RFID), near field communication (NFC), Wi-FI, cellular, and others known to those of skill in the art. Sensors and the data output therefrom, including their use for managing the design and operational risk of data centers, will be described in further detail below.

Process

Figure 2:
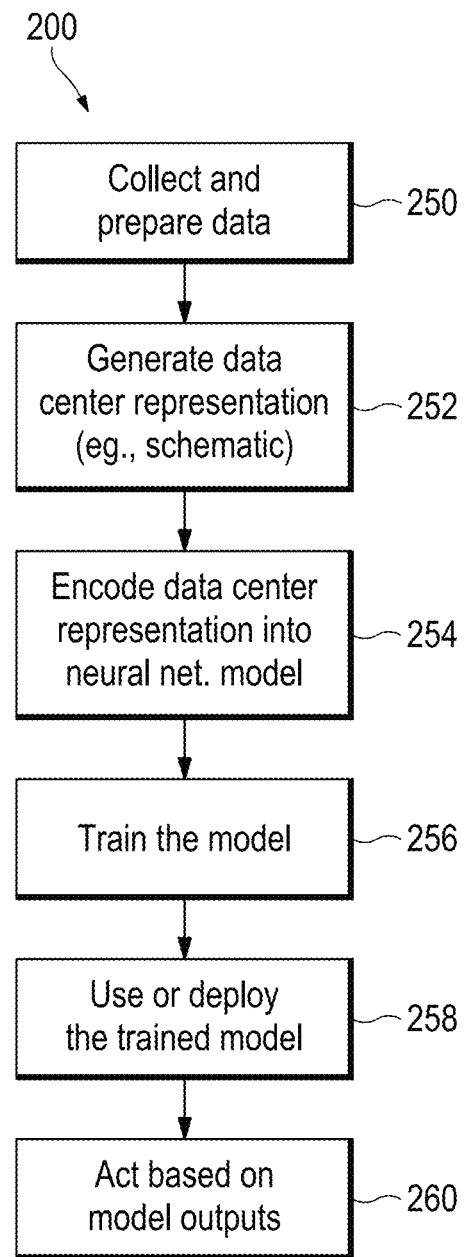
FIG. 2 is a flow chart illustrating an exemplary embodiment of a process for optimizing data centers.

FIG. 2 is a flow chart illustrating an exemplary embodiment of a process 200 for optimizing data centers, such as the data center 100 of FIG. 1. In some embodiments, optimizing data centers can include (1) improving the design of a data center to achieve desired objectives, and (2) managing risks, including identifying failures as well as their severity, likelihood of occurrence, detectability, and the like. In some embodiments, the process 200 can be performed by one or more systems (e.g., data center management system 119) configured to execute computer-readable instructions for performing one or more of the functions described herein.

As shown, optimizing data centers can include collecting and preparing data center data (step 250), generating a data center representation (step 252), encoding data center representation into a neural network model (step 254), training the model (256), using or deploying the trained model (step 258), and acting on the outputs of the model (step 260). These steps will now be described in more detail with reference to FIGS. 3 to 9.

For purposes of simplicity and illustration, it should be understood that systems, sub-systems and other components, mechanisms, devices, instruments and the like of the data center 100 or the facility 100f can be referred to as "sub-systems." As shown in FIG. 2, at step 250, data is collected and stored. In some embodiments for optimizing the data center 100, the collected and stored data can relate to or be derived from the data center 100, the facility 100f, and/or systems or subsystems therein. It should be understood that, in some embodiments, the data collected and stored at step 250 can be, include or be supplemented by data from or relating to other data centers, facilities, and systems or processes capable of aiding data center optimization.

In some embodiments, the data collected at step 250 can include values or metrics corresponding to sub-system values, sensor outputs and environmental conditions (collectively and interchangeably referred to as "metrics" or "values" or "data center data"). The sub-system values can be or include information or values relating to sub-systems, but are distinguishable from set points (e.g., static or variable values that can be set by a system or by a human operating a system) and measurements or outputs from sensors. Table 1 below illustrates examples of a subset of data center metrics, along with their subsystems and exemplary parameters.

TABLE 1

| Sub-System | Metric Name | Parameter |
|---|---|---|
| Facility | FWS (Facility Water Supply) Temperature Set Point | fws_water_supply_temp_sp |
| Facility | Number of FWS Pumps | fws_pumps_count |
| Facility | FWS Pumps Power Usage | fws_pumps_power |
| Facility | Facility Pump Pressure | fac_pump_pressure |
| Facility | Facility Valve Position | fac_valve_position |
| IT Rack | IT Load (kW) | it_load |
| IT Rack | IT Air Temperature Set Point | it_air_temp_sp |
| IT Rack | IT Water Temperature Set Point | it_water_temp_sp |
| CT | Number of CTs | ct_count |
| CT | CT Set Point | ct_sp |
| CT | Number of Running CT Pumps | running_ct_pump_count |
| CT | CT Pumps Power Usage | ct_pumps_power |
| CT | CT Fan Power | ct_fan_power |
| CDU | CDU Pressure | cdu_pressure |
| CDU | CDU IT Water Supply Temperature | cdu_it_water_supply_temp |
| CDU | CDU Valve Position | cdu_valve_position |
| CDU | CDU Inlet Pressure | cdu_inlet_pressure |
| CDU | CDU Return Pressure | cdu_return_pressure |
| Fan Wall | Fan Wall Air Differential Temperature | fanwall_airdiff_temp |
| Fan Wall | Fan Speed | fan_speed |
| Facility HX | Facility HX Flow Rate | fac_hx_flowrate |
| Facility HX | Facility HX Approach Temperature | fac_hx_approach_temp |
| CT HX | CT HX Approach Temperature | ct_hx_approach_temp |
| CT HX | CT HX Bypass Valve Position | ct_hx_bypass_valve_pos |
| ER HX | ER HX Approach Temperature | er_hx_approach_temp |
| ER HX | ER HX Flow Rate | er_hx_flowrate |
| ER HX | Facility Side Delta T | er_hx_delta_t |
| Environment | Wet Bulb | env_wetbulb |
| Environment | Dry Bulb | env_drybulb |
| Environment | Relative Humidity | env_rel_humidity |
| Environment | Enthalpy | env_enthalpy |
| Environment | Wind Speed | env_windspeed |
| Environment | Wind Direction | env_winddir |

As described above, the collected data of the data center 100 can be obtained over a period of time (e.g., one month, one year, etc.), and at varying frequencies. The data center data can therefore be historical data center data. The data can be collected from systems, sub-systems and/or sensors, for example. The data can be time series data, such that each value is associated with a specific point in time (e.g., timestamped) from the period of time during which it was collected. Table 2 below illustrates examples of time series data collected for exemplary parameters associated with the data center 100.

TABLE 2

| Time | Parameter | Value |
|---|---|---|
| 1:00 | it_air_temp_sp | 25.2 |
| 1:00 | it_water_temp_sp | 6.0 |
| 1:00 | fws_water_supply_temp_sp | 6.5 |
| 1:00 | cdu_it_water_supply_temp | 10.5 |
| ... | ... | ... |
| 1:01 | it_air_temp_sp | 25.3 |
| 1:01 | it_water_temp_sp | 6.0 |
| 1:01 | fws_water_supply_temp_sp | 6.5 |
| 1:01 | cdu_it_water_supply_temp | 10.8 |
| ... | | |
| 1:02 | it_air_temp_sp | 25.2 |
| 1:02 | it_water_temp_sp | 7.0 |
| 1:02 | fws_water_supply_temp_sp | 6.5 |
| 1:02 | cdu_it_water_supply_temp | 10.0 |
| ... | ... | ... |

It should be understood that the time, parameters and values shown in Table 2 are merely examples of a subset of parameters and values of the data center 100 collected over a three second period. As known to those of skill in the art, the values can be sampled, measured and/or obtained during any time period and at any intervals (e.g., 1 second, 2 seconds, 5 seconds, 10 seconds, etc.), whether in-band or out-of-band.

Figure 3:
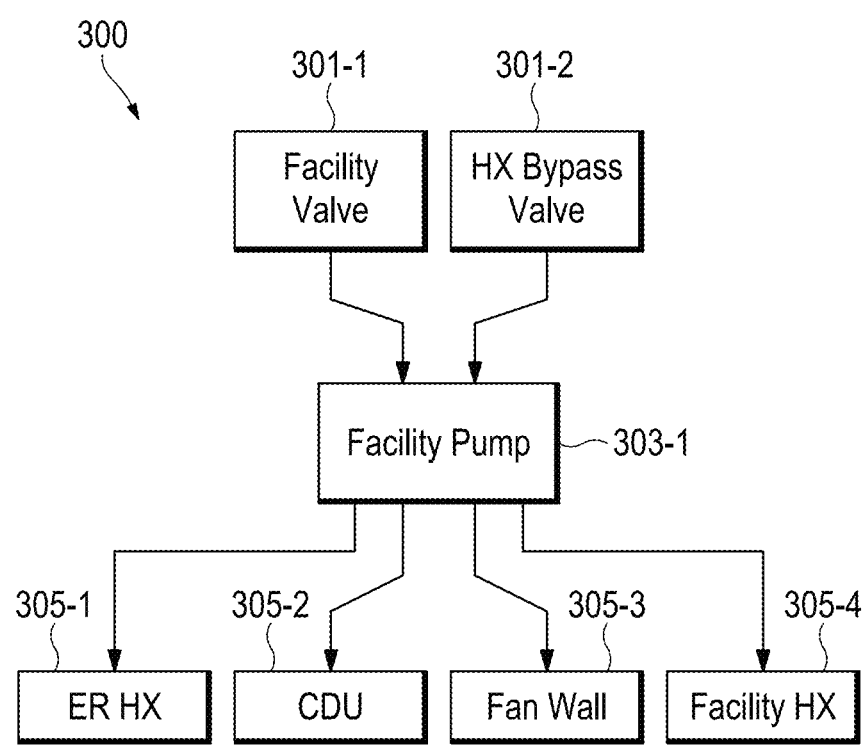
FIG. 3 is a graph illustrating an exemplary physical architecture of portions of the data center of FIG. 1, and interdependencies therebetween.
Figure 4:
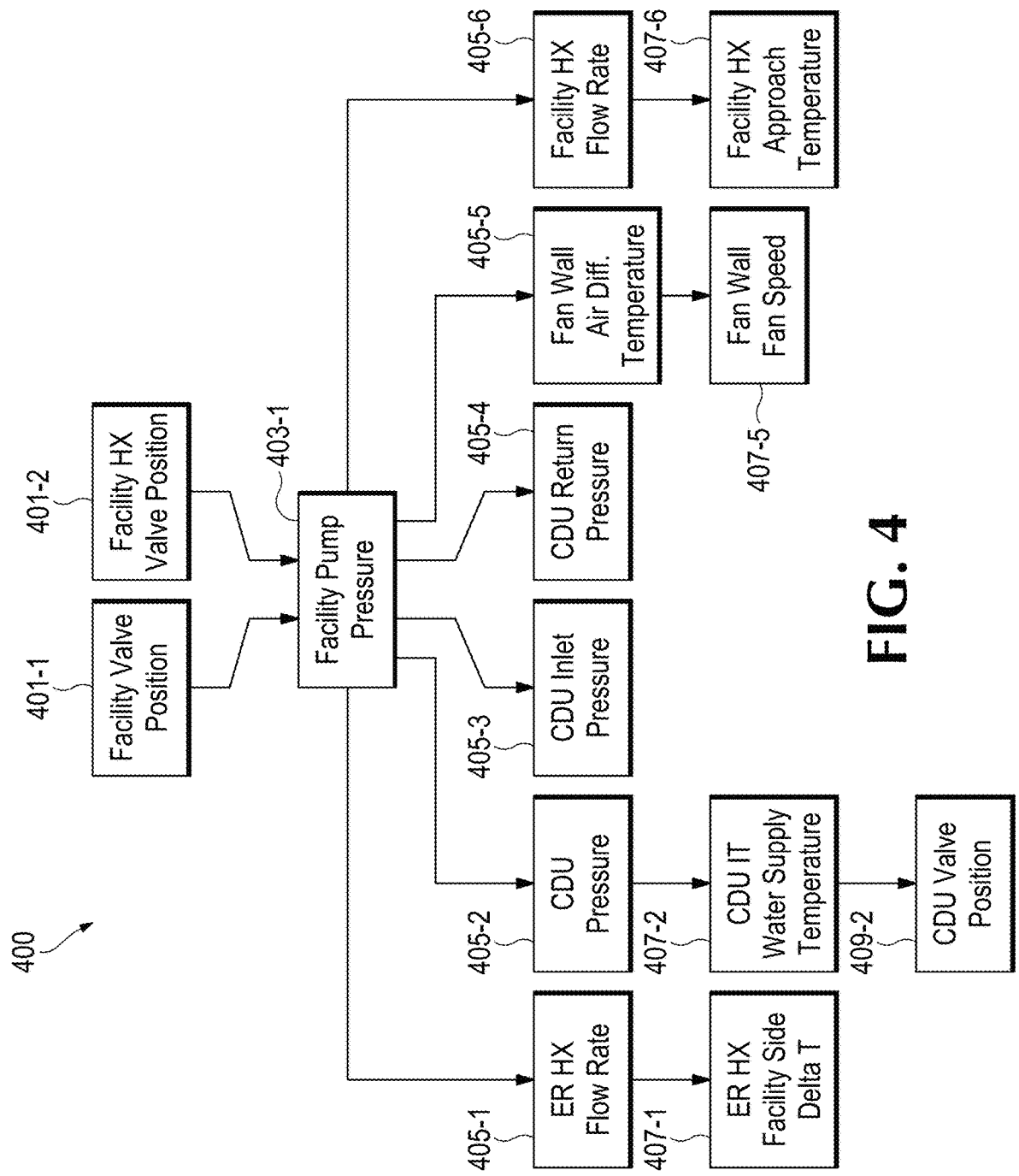
FIG. 4 is a graph illustrating an exemplary physical architecture and related parameters of portions of the data center, and interdependencies therebetween.
Figure 5:
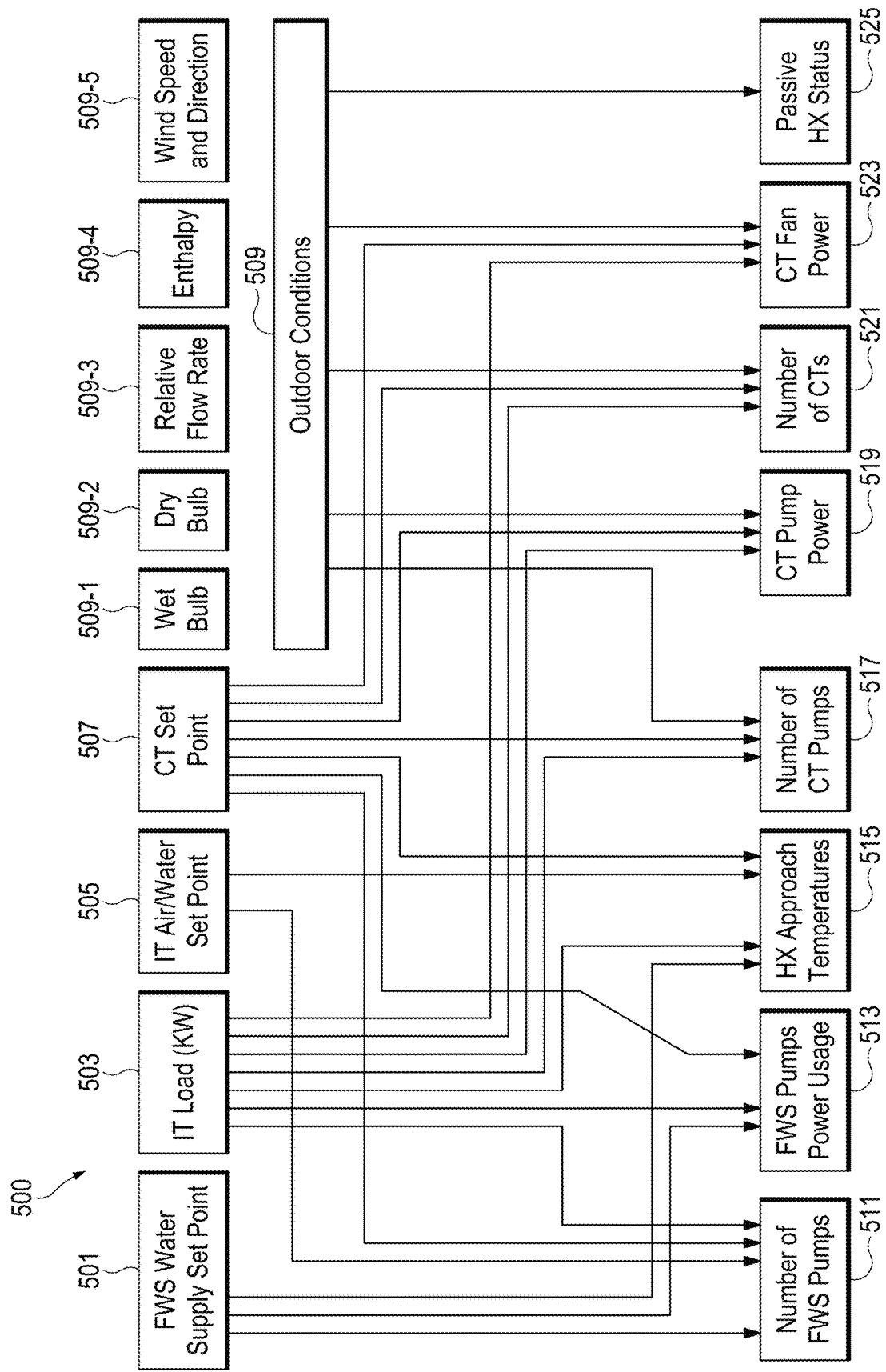
FIG. 5 is a graph illustrating exemplary parameters of exemplary systems, sub-systems, sensors and environmental conditions of a data center, and interdependencies therebetween.

At step 252, a representation of the data center 100 is generated. In some embodiments, the representation of step 252 can be generated prior to, concurrently with, and/or after the collection of data of step 250. In some embodiments, the data center representation can be a parameterized or parametric model. The parameterized model can be (1) a schematic describing the physical architecture of the data center and dependencies therein (e.g., as shown in FIGS. 3 and 4); and/or (2) a schematic of the systems, sub-systems and sensor values, set points, and/or environmental data, and the dependencies therebetween (as shown in FIG. 5). It should be understood that the schematics can correspond to all or subsets of the data center. Moreover, in some embodiments, the parameterized model can be an unordered collection of sensor metrics values (e.g., analogous to the example of Table 2);

In some embodiments, the schematics, such as those illustrated in FIGS. 3-5, can be graphs, such as layered graphs in which nodes (e.g., vertices) are arranged in layers. In the graphs, each node can represent a system, sub-system, sensor, environmental condition, and/or a parameter thereof. Interdependencies between nodes can be represented or encoded in the graphs using directed or undirected edges and loops, each of which can have or be associated with a corresponding weight relative to the level of dependency between the nodes of different layers. The graph can but need not be cyclic. A directed edge indicates that the dependency between two nodes is causal; while an undirected edge indicates that the dependency between two nodes can be bi-directional. In some embodiments, a graph can be described, in mathematical terms, as the set G=(V, E,R), where V is the set of the nodes of the graph, E is the set of the edges of the graph, and R is the relation classes of the graph (e.g., a directed edge may be one class R, an indirect edge may be another class R).

FIG. 3 illustrates an example graph 300 of an exemplary physical architecture of portions of the data center 100, and inter-dependencies (or interrelations) therebetween. FIG. 4 illustrates an example graph 400 of an exemplary physical architecture and related parameters of portions of the data center 100, together with inter-dependencies therebetween. More specifically, the graphs 300 and 400 illustrate and/or describe the downstream impact of the facility valve 301-1 and 401-1 (e.g., FIG. 1, valve 111-2) and the HX bypass valve 301-2 and 401-2 (e.g., FIG. 1, valve 111-1), at different levels of detail depending based on, among other things, available data and domain expertise information. As shown in FIG. 3, the facility valve 301-1 and HX bypass valve 301-2 have downstream impact on the facility pump 303-1 (e.g., FIG. 1, pump 109-1), which in turn has a downstream impact on the energy recovery (ER) HX 305-1 (e.g., FIG. 1, ER HX 107-1), CDU 305-2 (e.g., FIG. 1, CDU 103), fan wall 305-3 (e.g., FIG. 1, fan wall 113), and facility HX 305-4 (e.g., FIG. 1, HX 107-2)

FIG. 4 illustrates the physical architecture and related parameters of portions of the data center 100, and interdependencies therebetween. As illustrated in FIG. 4, the facility valve position 401-1 and the facility HX valve position 401-2 have downstream impacts on the facility pump pressure 403-1, which in turn has downstream impact on the ER HX flow rate 405-1, the CDU pressure 405-2, CDU inlet pressure 405-3, CDU return pressure 405-4, fan wall air differential temperature 405-5, and facility HX flow rate 405-6. The ER HX flow rate 405-1 has a downstream impact on the ER HX delta T 407-1. The CDU pressure 405-2 has a downstream impact on the CDU IT water supply temperature 407-2, which in turn has a downstream impact on the CDU valve position 409-2. The fan wall air differential temperature 405-5 has a downstream impact on the fan speed 407-5. The facility HX flow rate 405-6 has a downstream impact on the facility HX approach temp 407-6.

In some embodiments, the dependencies represented in the graphs 300 and 400 can correspond to or derive from the following exemplary operation of the data center 100. During operation of the data center 100, power to a controller is lost, resulting in the loss of communication with the facility valve and HX bypass valve. As a result of the loss of communication with the facility and HX valves, the valves fail in the closed position, causing a cascading impact including, among other things: the facility valve and HX bypass valve closed, causing deadheading of the facility pump and, in turn, shutdown of the facility pump; flow to the downstream CDU shut off; the pressure drop on the facility side of the CDU decayed to zero; the temperature of the water delivered to the IT racks quickly rose up to a point that the servers therein started to shut down; the CDU valve on the facility side opened to 100% (fully opened) in an attempt to allow more flow through the CDU (there was now no flow); the CDU inlet and return pressures for the CDU fell and rose, respectively, to an equilibrium point somewhere between the original inlet and return pressure values. In some embodiments, the impacts can result in system failures and/or anomalies. For example, as illustrated by the shaded nodes in FIGS. 3 and 4, the above exemplary operation causes anomalies at the CDU 305-2, namely with respect to the CDU pressure 405-2, CDU water supply temperature 407-2 and the CDU valve position 409-2.

FIG. 5 illustrates an example graph 500 of exemplary parameters of exemplary systems, sub-systems, sensors and environmental conditions of a data center, and inter-dependencies (or interrelations) therebetween. As discussed above, data center parameters can include set-points, examples of which are included in FIG. 5. More specifically, the graph 500 shows the correlations of parameters FWS supply water set point temperature 501, IT load 503, IT air/water set point temperature 505, cooling tower set point temperature 507, outdoor conditions 509 (including wet bulb temperature 509-1, dry bulb temperature 509-2, relative humidity 509-3, enthalpy 509-4, wind speed and direction 509-5) to parameters number of FWS pumps 511, FWS pumps power usage 513, HX approach temps 515, number of CT pumps 517, CT pump power 519, number of cooling towers 521, CT fan power 523, and passive HX system status 525.

The IT load (e.g., IT load 503) can be correlated to the workload that is being run in the data center. A data center can control or manage its overall IT load (e.g., power consumption) using a job scheduler to achieve facility power consumption profiles. Thus, for example, as shown in FIG. 5, the IT load 503 can impact:

Number of FWS pumps (e.g., 511): the number of pumps running can depend upon the IT load;

FWS pumps power usage (e.g., 513): this value can be related to the number of pumps running and therefore can indirectly be related to the IT load;

Heat exchanger (HX) approach temperature (e.g., 515): the temperatures into and out of the HX can be directly related to the IT load. These temperatures along with their set-points can drive the HX approach. This relationship makes the HX approach temperature indirectly related to the IT load;

Number of CTs (e.g., 521): the CTs are the final rejection point for the IT load, so there can be a direct relationship between the IT Load and the number of CTs running;

Number of CT pumps running (e.g., 517): this value can be directly related to the number of CTs running, and indirectly related to the IT load;

CT pump power (e.g., 519): this value can be directly related to the number of CT pumps running, and indirectly related to the IT load; and CT fan power (e.g., 523): this value can be directly related to the number of CTs running, and indirectly related to the IT load.

It should be understood that the structure, breadth and level of detail of the data center representation or schematic can vary as desired or needed, depending, in part, on the available data (e.g., expertise) and the data center being represented. Moreover, the level of detail of the data center representation or schematic can be controlled based on the computational power available to run the model. That is, for example, a server with limited memory and no GPUs would typically generate or obtain a less detailed representation or schematic than for a more powerful system having additional memory and GPUs.

Returning to FIG. 2, the data center representation generated at step 252 can be used to train and build a model that, as described in further detail below, can be deployed for optimization functions. More specifically, to that end, at step 254, the data center representation (e.g., graphs 300, 400, 500) is encoded as a machine learning algorithm such as one or more neural networks. As described herein, encoding of the graphs can include designing a neural network, and incorporating the structure of the graph, such as the relationship or dependencies between nodes of the graph (e.g., whether two nodes are directly and/or indirectly related), into the neural network.

Encoding graphs of data centers into neural networks provides knowledge for training a more optimal model, thereby reducing or eliminating the burden of acquiring that knowledge. Moreover, in some embodiments, the graphs can be used to identify correlations and dependencies among systems (or sub-systems, sensors, environmental conditions) and among parameters. These correlations and dependencies can be used to determine the optimal or most valuable nodes to encode into the neural network. That is, for example, by encoding the graph of FIG. 4 into a neural network, the neural network could be designed such that many other systems and parameters (e.g., hundreds, thousands, millions) can be omitted.

Still with reference to step 254, of FIG. 2, it should be understood that the encoding of the data center representation (e.g., schematic) into a neural network can be performed using a variety of graph encoding techniques known to those of skill in the art. For example, in FIG. 3 described above, each of the nodes represents or corresponds to one or a set of systems, subsystems, sensors, etc. of the data center, such as a CDU, set of CDUs, a facility valve, and a facility pump. Accordingly, encoding of the graph 300 into a neural network can cause a design in which each neural network node corresponds to a system, subsystem, sensor, etc. of the data center, as in the graph 300. Moreover, in FIG. 4, each of the nodes of the graph 400 represents or corresponds to a parameter of a system, sub-system, sensor, and the like (e.g., as shown in Table 1). Accordingly, encoding of the graph 400 into a neural network can cause a design in which each neural network node corresponds to a parameter such as facility_pump_pressure, facility_valve position, and the like. It should be understood, however, that the neural network can also include other nodes beyond those illustrated in a graph. As described in further detail below, such nodes, while not having any sensor measurements or values associated therewith (e.g., from an un-instrumented sub-system), and or not having relationships captured in the graph representation, can nonetheless be determined by the neural network to have an impact on the state or output value of a node. In some embodiments, a neural network is designed or encoded from the graph G=(V,E,R), where V is the set of the nodes of the graph, E is the set of the edges of the graph, and R is the relation classes of the graph (e.g., a directed edge may be one class R, an indirect edge may be another class R).

Figure 6:
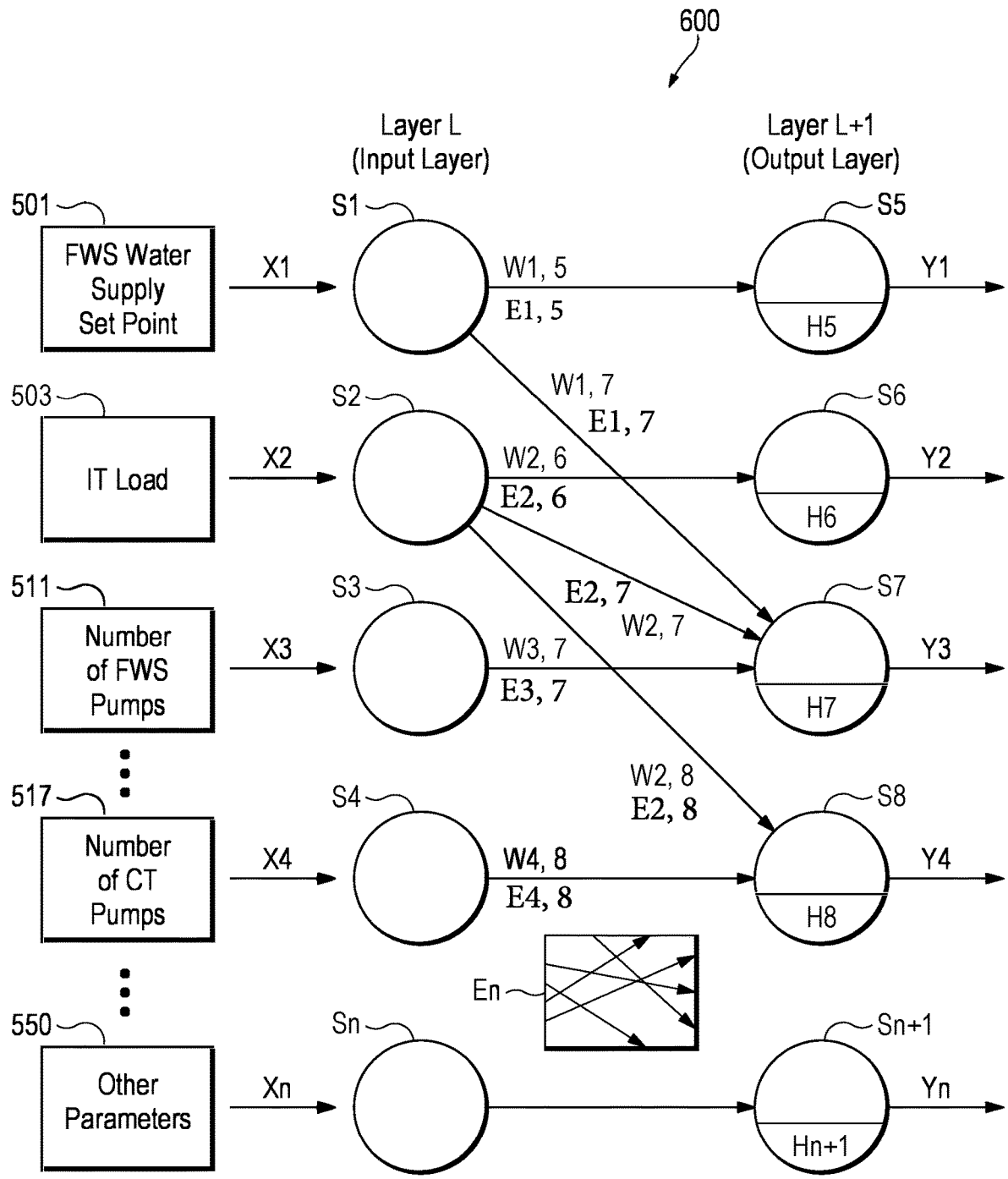
FIG. 6 illustrates an exemplary embodiment of a neural network corresponding to or encoded from the graph of FIG. 5.

FIG. 6 illustrates an exemplary neural network 600 corresponding to or encoded from the data center graph 500 of FIG. 5. For purposes of simplicity and illustration, the neural network 600 corresponds to exemplary portions of the graph 500. It should be understood, however, that the neural network 600 can correspond to the entire graph 500, including the illustrated nodes 501 to 525 and others not illustrated.

More specifically, the illustrated neural network 600 includes an input layer L that includes exemplary nodes S1, S2, S3 and S4. The nodes S1 to S4 correspond, respectively, to nodes 501, 503, 511 and 517 of the graph 500 of FIG. 5, in accordance with the encoding of the graph. Moreover, the nodes S1, S2, S3 and S4 of the input layer receive input values X1, X2, X3 and X4, respectively. The values X1, X2, X3 and X4 can correspond to respective parameters from the data collected at step 250 (e.g., as shown in exemplary Table 2). Accordingly, the values X1 to X4 can correspond to the parameters fws_water_supply_temp_sp, it_load, fws_pumps_count, and running_ct_pump_count, which correspond, respectively, to the metrics or values FWS Supply Water Set Point (or FWS Water Supply Temperature Set Point), IT Load, Number of FWS Pumps, and Number of Running CT Pumps.

In some embodiments, the neural network 600 can be configured such that the inputs X1 to X4 are in the form of a vector or a single value. In some embodiments, for example, one or more of the inputs X1 to X4 can be a vector that includes a parameter value at sequential times. For instance, in some embodiments, the data used to generate the inputs X1 to X4 includes data read, captured or otherwise obtained one second intervals. The vector input (e.g., X1 to X4) can therefore include ten values each associated with sequential times. The vector can therefore represent a ten second period of the specific parameter.

In some embodiments, the neural network can be configured such that each node of the network does not correspond to a specific parameter among the collected data but, instead, correspond to systems, sub-systems and the like. For instance, a neural network encoded based on the graph 300 in which each node corresponds to a system, sub-system, sensor, and the like (e.g., facility valve, facility pump), can receive as an input a vector of attributes of that system, subsystem or sensor. The facility pump can therefore be represented as a vector (or matrix) in which each value corresponds to a parameter such as fws_pump_power and fws_pump_pressure. As described above, the input vector can be configured to capture values during multiple time instances. In such cases, each of the parameters (e.g, fws_pump_power and fws_pump_pressure) can correspond to a row in the vector and each column can represent time instance or time step in the vector. An input that includes two properties or attributes of a system over a ten second period, at one second intervals, could be encoded as a 2×10 vector or matrix. It should be understood that the structure and substance of the input values X1 to X4 of the neural network 600 can be configured in various ways as deemed optimal based on the available data, graphs, neural network design, and/or objective of the neural network. In some embodiments, dependency information can be encoded into the inputs X1 to X4.

Still with reference to FIG. 6, the neural network includes another layer L+1, which, in some embodiments, can be an output layer. It should be understood however, that the neural network 600 can include any number of layers, each of which can include all of the nodes of the other layers. The output layer includes nodes S5 to S8, which correspond to the nodes S1 to S4. That is, as indicated above, the nodes S1 to S4 are a representation or encoding of nodes from the graph 500, namely the nodes 501, 503, 511 and 517. Likewise, the nodes S5 to S8 are also representations or encodings of the nodes 501, 503, 511 and 517, at which information such as hidden states and values are calculated and output as outputs Y1 to Y4.

As illustrated, the relationship between the nodes S1 to S4 and S5 to S8 is represented by edges (e.g., edges E1,5, E1,7, E2,6, E2,7, E2,8, E3,7, and E4,8) having respective weights W1,5, W1,7, W2,6, W2,7, W2,8, W3,7, and W4,8. The training and deployment of the model based on the neural network 600, including the calculation of weights and outputs, is described in further detail below. Nonetheless, it should be understood that the outputs Y1 to Y4 can be configured as deemed necessary or optimal. In some embodiments, the outputs Y1 to Y4 can include the predicted value of the parameters 501, 503, 511 and 517, based on the inputs and weights.

Moreover, the outputs Y1 to Y4 can include and/or be a function of the hidden state values H5 to H8 of the nodes S5 to S8. The hidden state of the nodes can be a value that indicates, for instance, whether the node is normal or anomalous (e.g., an anomaly or failure exists). The hidden state value can be configured to indicate further detail, such as whether the state is normal, moderately anomalous, highly anomalous, and the like. An anomalous state indicates that a parameter or system (or sub-system, sensor, etc.) is irregular, failing or the like. In some embodiments, the outputs Y1 to Y4 can be in the form of single values or vectors. As described above, when the nodes in the neural network correspond to systems, sub-systems, sensors, and the like, the outputs can likewise represent the value or hidden state of systems, sub-systems, sensors, and the like.

The hidden state of each node can indicate whether an anomaly exists in the data center; which systems, sub-systems, and/or parameters of the data center are anomalous; and the source of the anomaly, which can be determined based on the relationships or dependencies of the node or group of nodes that are anomalous. As described above, each node is associated with a hidden state and an observable output (e.g., the sensor value associated with the node). The hidden state of a node I is denoted by h_i, and the layer of the neural network is denoted by L. Then, for example, the nodes in L+1 are related to the nodes in L as follows:

$$h_i^{L+1} = f_1\left(\sum_{m \in M} f_2(h_i^L, h_j^L)\right)$$

In some embodiments, the function f1 can be a sigmoid or a rectifier function, while f2 can be chosen to be a linear operation (e.g., a matrix operation).

It should be noted that some nodes may only have hidden states, with no observable outputs. For example, a system or sub-system that does not produce any data can nonetheless be included in a neural network. A node can produce no data and therefore not have an observable output, for example, because it is not equipped with a sensor, the sensor is failing, and/or data is otherwise not being collected therefrom. In such cases, that node will be included in the neural network with only a hidden state. In this way, if a node does not have any observable output, it therefore will not have any perceivable impact on other nodes. On the other hand, if the node has a sensor measurement, then it will typically have both a hidden state and an observable output. In the case of a set-point or an outdoor condition, the hidden state may still exist (from a modeling perspective), but only its observable output (e.g., the relative humidity) may be of interest.

Notably, the neural network can incorporate various types of dependencies among nodes, including directed edges, undirected edges, and loops. FIG. 6, for example, illustrates a loop as indicated by edges E1,5, E2,6, E3,7, and E4,8; and illustrates directed edges as indicated by edges E1,7, E2,7, and E2,8. Although not illustrated in FIG. 6, undirected edges indicating a bidirectional relationship could be indicated or represented by, for example, edges E1,7 and E3,5, each of which is a directed edge to and from parameters FWS Supply Water Point and the Number of FWS Pumps.

It should be noted that, in FIG. 6, nodes Sn and Sn+1 are illustrated in layers L and L+1. These nodes are intended to indicate that the neural network 600 can include any number of nodes corresponding to any number of parameters (or systems, sub-systems, sensors, etc.), such as the parameters from FIG. 5 other than parameters 501, 503, 511 and 517. As described above, the parameters can be input into corresponding nodes in the layer L (e.g., as input Xn), and output as Yn. En represents the numerous dependencies (e.g., edges) that can exist among the nodes Sn and the nodes Sn+1, as well as among the nodes Sn and Sn+1 and the nodes S1 to S8. It should be understood that, likewise, the edges among the nodes S1 and S8 can include edges other than those illustrated in FIG. 6, which are for exemplary purposes.

Returning to the process 200 of FIG. 2, once the graph of the data center (e.g., graphs 300, 400, 500) has been encoded into a neural network model, the neural network model is trained at step 256. The training of step 256 includes, among other things, estimating or calculating parameter ranges, statistical distributions of perturbations, initial conditions, and constraints such as upper and lower thresholds of values. Accordingly, the weights W shown in FIG. 6 are estimated through the iterative training process, until the model is of an optimal accuracy. The trained model not only learns whether there is a relationship or dependency between two nodes, but identifies the level of dependency between the nodes.

In some embodiments, the training of the neural network can be performed using a collection of data that includes values or metrics (e.g., as shown in Table 2). These data can be associated with one or more systems, sub-systems, sensors, and environmental conditions. For instance, the data can be sensor measurements collected over a period of time. Using the collection of data, the training can estimate parametric relationships or parameters such as the marginal and joint distributions among nodes of a neural network, which can represent systems, sub-systems, sensors, conditions and/or data center parameters. For instance, a family of random processes such as a multi-variate Gaussian random process is selected. The data is used to estimate the parameters of the multi-variate Gaussian random process, which can include estimating the covariance structure and any Markov time-series parameters. In one example embodiment of a multi-variate Gaussian random process, the model is of the following form:

$$f(X,t;\theta)=h(f(X,t-1;\theta))$$

The function f is multi-variate defined fully with its mean vector and covariance matrix; the function h is a linear transformation, and the parameters θ are estimated during the training stage using the metric values collected over a period of time.

In some embodiments in which a graph is used to encode the neural network, the estimation can be viewed as a dynamic Bayesian network estimation or a neural network estimation. Nonetheless, the parameters (e.g., marginal and joint distributions among nodes) can be estimated from the data as part of the training Returning to FIG. 2, once the model has been trained, it can be used or deployed at step 258, as described in further detail below. For example, the model can be used to generate large numbers of scenarios that the data center can undergo, test a wide range of "what-if" scenarios, measure risks associated with the system, make design choices to minimize risk and optimize any objective functions.

In some embodiments, the model is deployed as step 258 for, among other things, testing a wide range of "what-if" scenarios, measuring risks associated with the modeled system, making design choices to minimize risk and/or optimize any objective function.

For example, optimizing data center design can be achieved by analyzing how certain changes would impact the data center. As described above, the trained model can be deployed by inputting data for the values X1 to X4. The model is run using the input values, and resulting values Y1 to Y4 are output. The outputs can be a vector including the model's predictions of the parameter values and/or the state of the parameter (e.g., an anomaly value), which can be a hidden state in the nodes S5 to S8 of the layer L+1. For purpose of simulation, the input values X1 to X4 can be hypothetical rather than actual values. That is, the purpose of the hypothetical values X1 to X4 is to determine what the output values and states of the parameters (or systems, sub-systems, etc.) would be under those hypothetical conditions. It should be understood that other hypothetical changes to the data center can be simulated beyond just changing values of parameters. For instance, simulations can be performed in which parameters in the model are replaced or removed; parameters associated with a sub-system (e.g., in the scenario in which each node correspond to a sub-system and is represented by an encoding of multiple parameters or attributes) anomalies and frequencies of anomalies are input into the node, and others known to those of skill in the art.

Figure 7:
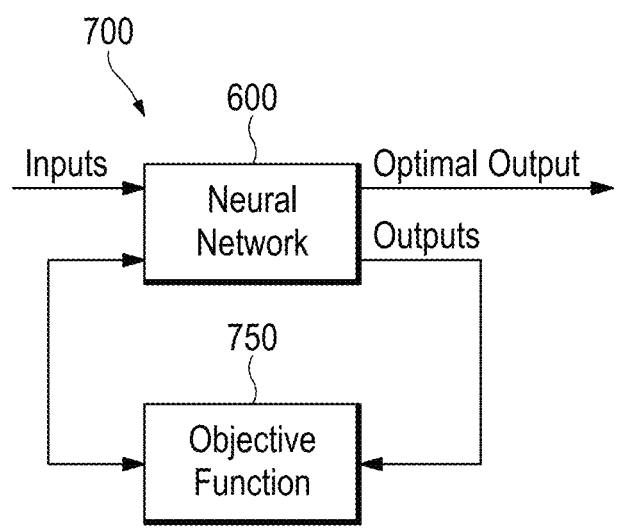
FIG. 7 is a diagram illustrating a system for maximizing an objective function.

In some embodiments, the simulation to optimize the design of the data center can include maximizing an objective function. For example, FIG. 7 is a diagram 700 illustrating a system for maximizing an objective function. As shown in FIG. 7, inputs are fed into the trained neural network 600. As shown in FIG. 6, the inputs X1 to X4 can be values of parameters fws_water_supply_temp_sp, it_load, fws_pumps_count, and running_ct_pump_count. In some embodiments, the neural network 600 calculates outputs Y1 to Y4 by, at each node, processing inputs and applying an activation function to the result. The processing of the inputs can be, for example, a weighted sum of all of the inputs into each neuron. As known to those of skill in the art, the activation function applied at each node can vary and be selected as deemed optimal. The outputs Y1 to Y4 can be the values of the parameters fws_water_supply_temp_sp, it_load, fws_pumps_count, and running_ct_pump_count predicted by the neural network based on the model and the input values of the parameters. The outputs of the neural network 600, which can be the predicted values of the parameters (or systems, sub-systems, etc.) can be fed to an objective function 750, which can output an objective function result value. That resulting value can be used to re-run the neural network 600 using different inputs (e.g., different types of inputs, different values, etc.), until the result of the objective function is maximized or minimized to an optimal value. It should be understood that the changes to the inputs so as to maximize or minimize, as desired or appropriate, the objective function can be made by a machine and/or human using a machine.

As known to those of skill in the art, the objective function can be any of a variety of functions, designed or selected for a specific purpose. For example, the objective function can be a function of resiliency, power/thermal efficiency and/or cost of the data center. Data center resiliency can be measured by and/or depend on the risks of failures of subsystems or anomalies in the parameters; cost can be measured by and/or depend on the resources operating in the data center; and power/thermal efficiency can be represented by power usage effectiveness (PUE).

In some embodiments, the objective function can be a function of the severity of a failure or anomaly, the occurrence likelihood of a failure or anomaly, and the detectability of a failure or anomaly. Accordingly, the design choices that are made for the simulation are selected with the goal of minimizing the objective function.

Moreover, in some embodiments, deploying the model at step 258 can include running a simulation intended to manage risks in the data center, which can include minimizing the risks. To this end, the model can be run with varied parameter values, varying initial conditions, using anomalous values, changing frequencies of anomalies, and the like. Based on the results of the simulation, it is possible to detect whether anomalies were identified by the model and/or the rate, likelihood and/or speed which an anomaly/failure would get detected or not get detected under certain conditions or certain amounts of time. This information can be used to change the data center design (e.g., add instrumentation, move instrumentation, etc.), as needed. Moreover, simulations can be run a number of times under varying conditions, and averaging the outcomes to determine the occurrence likelihood of failures.

Returning to FIG. 2, at step 260, the results of deploying the model at step 258 are acted on and/or transmitted. As descried above, the results can be the identification of a failure in a data center, the identification of an anomalous system, sub-system, sensor, parameter, etc., an optimal data center design to achieve a desired objective (e.g., a function of one or more of thermal/power efficiency, resiliency, cost; or a function of severity of a failure, of the likelihood of the occurrence of the failure, detectability of the failure). For example, the identification of a failure or anomaly can cause messages and/or instructions (e.g., open valve to 100%) to be transmitted or executed, for example, to remedy the identified problem.

Exemplary Implementation

Figure 8:
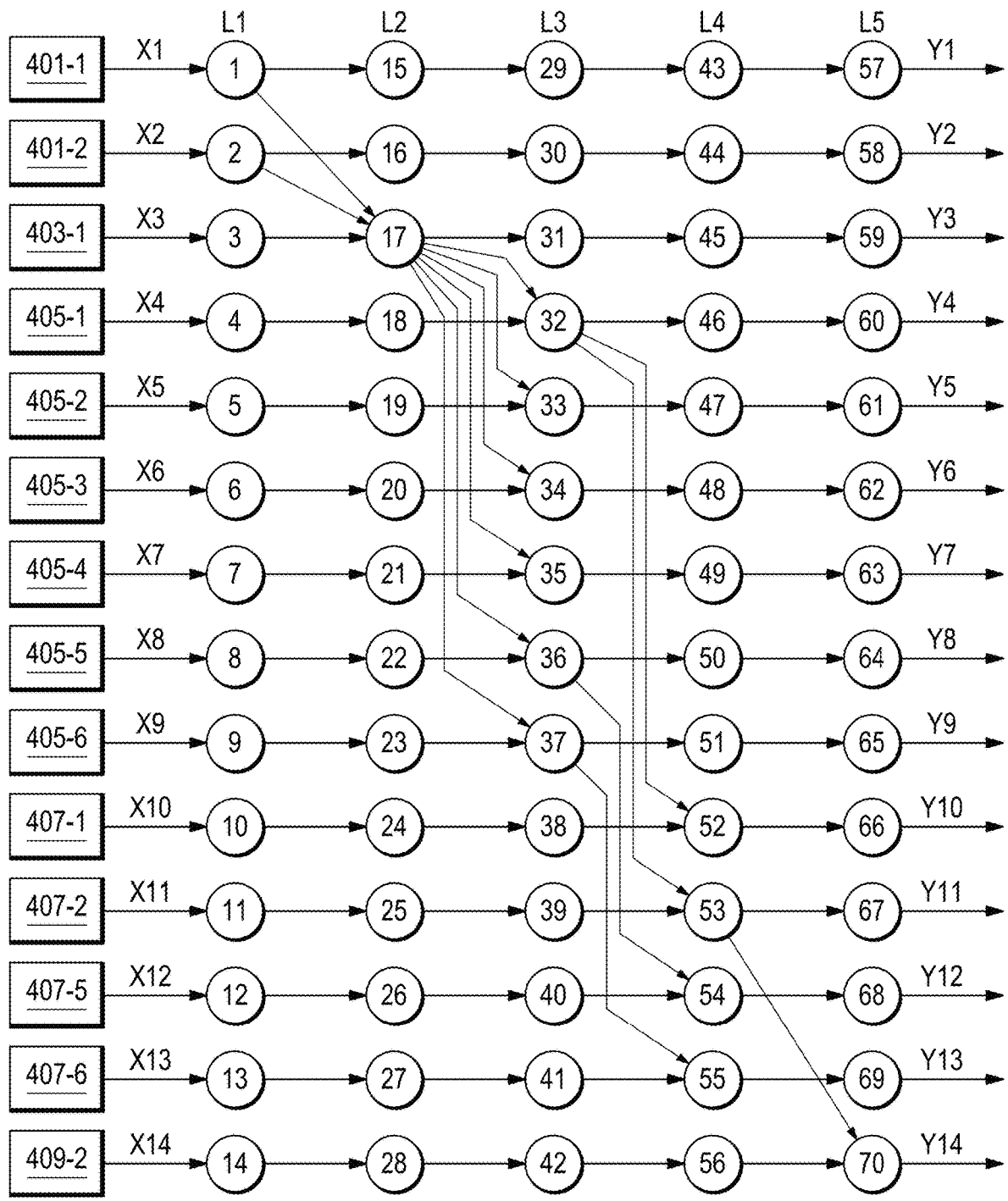
FIG. 8 illustrates an exemplary embodiment of a neural network encoded from the graph of FIGS. 4.

FIG. 8 below illustrates an exemplary embodiment of a neural network 800, encoded from the graph 400 of FIG. 4. As described above, the graph 400 of FIG. 4 illustrates dependencies between parameters of systems or sub-systems of the data center. Specifically, the dependencies show the downstream impact of a specific operation scenario described above with reference to FIG. 4—initiated by a failure that causes the facility valve position 401-1 and the HX bypass valve position 401-2 (collectively referred to herein as "401") to be set to closed. Notably, their closure causes a direct impact on the facility pump pressure 403-1—namely the pump keeps pumping and, in turn, deadheads, causing the pressure to not be within specification, the pump to shut down, and the flow to drop to 0. This direct impact is a linear relationship illustrated by the edges connecting the valve positions 401-1 and 401-2. The facility pump pressure 403-1, in turn, has an impact on various other system or sub-system parameters such as the ER HX flow rate 405-1, CDU pressure 405-2, CDU inlet pressure 405-3, CDU return pressure 405-4, fan wall air differential temperature 405-5, and facility HX flow rate 405-6 (collectively referred to herein as "405"). Again, this direct impact is a linear relationship illustrated by the edges therebetween. And, as illustrated in the graph 400, some of the parameters 405 have downstream impacts on other parameters (e.g., ER HX facility side delta T 407-1, CDU IT water supply temperature 407-2, fan wall fan speed 407-5, and facility HX approach temperature 407-6 (collectively referred to herein as "407").

However, the absence of edges connecting the parameters 401 to the parameters 405, 407 or 409, implies a lack of interdependence or relationship therewith, despite the knowledge or fact (e.g., from historical data or domain expertise) that the position of the valves 401-1 and 401-2 can indeed impact those parameters (e.g., the ER HX flow rate 405-1, CDU pressure 405-2, CDU inlet pressure 405-3, CDU return pressure 405-4, fan wall air differential temperature 405-5, facility HX flow rate 405-6, ER HX facility side delta T 407-1, CDU IT water supply temperature 407-2, fan wall fan speed 407-5, and facility HX approach temperature 407-6, CDU valve position 409-2). In some embodiments, the parameters that have a direct impact (e.g., as indicated by an edge therebetween) on another parameter are deemed to be primary indicators, while those parameters that have an indirect impact (e.g., as indicated by the absence of an edge therebetween) on another parameter are deemed to be supplemental indicators (e.g., secondary indicators, tertiary indicators, etc.).

As described herein, a neural network can be configured such that a failure or anomaly of a node (e.g., parameter, system, sub-system, etc.) can be caused by other nodes that are not directly connected thereto, and the failure or anomaly can be traced back to the primary and supplemental indicator nodes that may have caused or contributed to the failure or anomaly. For example, in FIG. 4, the closure of the facility valves 401-1 and 401-3 would indeed trigger a downstream failure or anomaly of the CDU valve position 409-2 node recognized by the neural network, and the impacting indicator nodes (e.g., primary: CDU IT water supply temperature 407-2; supplemental: CDU pressure 405-2, facility pump pressure 403-1, facility valve position 401-1 and HX bypass valve position 401-2).

The neural network 800, which is based on an encoding of the graph 400, is designed such that indirect or non-linear relationships, and primary and supplemental indicators, can be accounted for. In the neural network 800, nodes numbered 1 to 14 in the first layer L1 correspond to the parameters of FIG. 4, namely: 401-1, 401-2, 403-1, 405-1, 405-2, 405-3, 405-4, 405-5, 405-6, 407-1, 407-2, 407-5, 407-6 and 409-2, respectively. X1 to X14 are values input into nodes 1 to 14. The values X1 to X14 include data of the parameter types 401-1, 401-2, 403-1, 405-1, 405-2, 405-3, 405-4, 405-5, 405-6, 407-1, 407-2, 407-5, 407-6 and 409-2, respectively, as illustrated. As described above, the inputs X1 can be single values, or can be vectors that include multiple sequential values of the parameter corresponding to time instances during a time period or window of time (e.g., 10 seconds). In embodiments in which the nodes in the input layer represent systems, sub-systems and the like that are associated with multiple attributes, the vectors can include values of multiple parameter types and of multiple time instances in a period of time.

The design of the neural network 800 corresponds specifically to the graph 400 generated from a particular data center operation scenario. It should therefore be understood that the neural network 800 can include many other nodes and edges representing other parameters, systems, sub-systems, etc. and relationships therebetween. Edges between nodes in sequential layers indicate linear relationships. It should be noted that edges between nodes corresponding to the same parameter are loops, indicating a direct relationship therebetween. The edges between node 1 and node 17, and node 2 and node 17, indicate the direct relationship of the valve positions 401-1 and 401-2 with the facility pump pressure 403-1. Notably, however, any prediction of the CDU valve position 409-2 calculated and output by the node 28 would not account for the impact of the valve positions 401-1 and 401-2 (or any other parameter).

The neural network 800 therefore includes multiple layers. The output of nodes in each layer is fed forward to other directly related nodes in the subsequent layer, in accordance with the nodes and relationships of the graph 400. In turn, the predicted values Y1 to Y14 are output by nodes 57 to 70 at layer L5. The outputs Y1 to Y14 account for the impact of primary and supplemental factors or indicators. For instance, the CDE valve position output Y14 is based on the direct and indirect relationships upstream that may have had an impact thereon. It should be understood that, as noted above, the outputs Y1 to Y14 can include the observable output of the node (e.g., the parameter value) and/or the hidden state (e.g., anomaly value) of the node.

As described above, each node is associated with an observable output and a hidden state. The observable output can be, for example, a value of the specific parameter type (e.g., a percentage for a facility valve position). The hidden state is a value indicating whether the node is anomalous and/or the severity of the anomaly. Accordingly, when a failure or anomaly is detected in the outputs Y1 to Y14, it is possible to determine the impacting or triggering nodes by tracing the relationships, and analyzing the observable outputs and hidden states of the connected nodes that function as primary and supplemental indicators. For instance, for a failure or anomaly of the output Y14, tracing back the edges that lead to the node 70 can lead all the way back to the nodes 1 and 2, which are supplemental indicators of the CDU valve position failure or anomaly.

In some embodiments, the trained neural network 800 can be deployed to detect anomalies among the nodes representing parameters 401-1, 401-2, . . . , 409-2. The anomalies can be detected based on the node outputs. For instance, the outputs Y1 to Y14 output from the nodes 57-70 can include an anomaly value corresponding to the hidden state of the respective node. In some embodiments, an anomaly value equal to or higher than 1.0 indicates anomalous behavior in the data, whereas an anomaly value lower than 1.0 indicates normal behavior in the data. It should be understood that the severity of the anomaly or failure can be based on the anomaly value. That is, a higher anomaly value indicates a more significant anomaly. The anomaly value can therefore indicate two states: e.g., anomalous or not anomalous (e.g., normal); or more states: e.g., normal (e.g., below 1.0), moderately anomalous (e.g., between 1.0 and 1.010); and highly anomalous (e.g., above 1.010).

Although not illustrated in FIG. 8, in some embodiments, the outputs of the nodes 57 to 70 can be fed to one or more nodes in one or more subsequent layers L6 to Ln. The one or more nodes in the subsequent layer or layers can be configured to produce an output that in accordance with the desired objective of the neural network—e.g., to obtain the requisite information. For example, such output outputs from nodes in subsequent layer can indicate a value of the resiliency, thermal/power efficiency and/or cost of the data center, based on the parameters input into the mode. In another example, the outputs can be values of the severity of a failure or anomaly (of a system, sub-system, sensor, parameter, etc.), the likelihood of the occurrence of that failure or anomaly, and the detectability of the failure. In some embodiments, the outputs can be input into an objective function, which can be a function of resiliency, efficiency and/or cost of the data center, and/or the severity of a failure or anomaly, the likelihood of the occurrence of the failure or anomaly, and/or the detectability of the failure or anomaly. The model can be re-run until the objective function is maximized or minimized in accordance with the intended goal.

Figure 9:
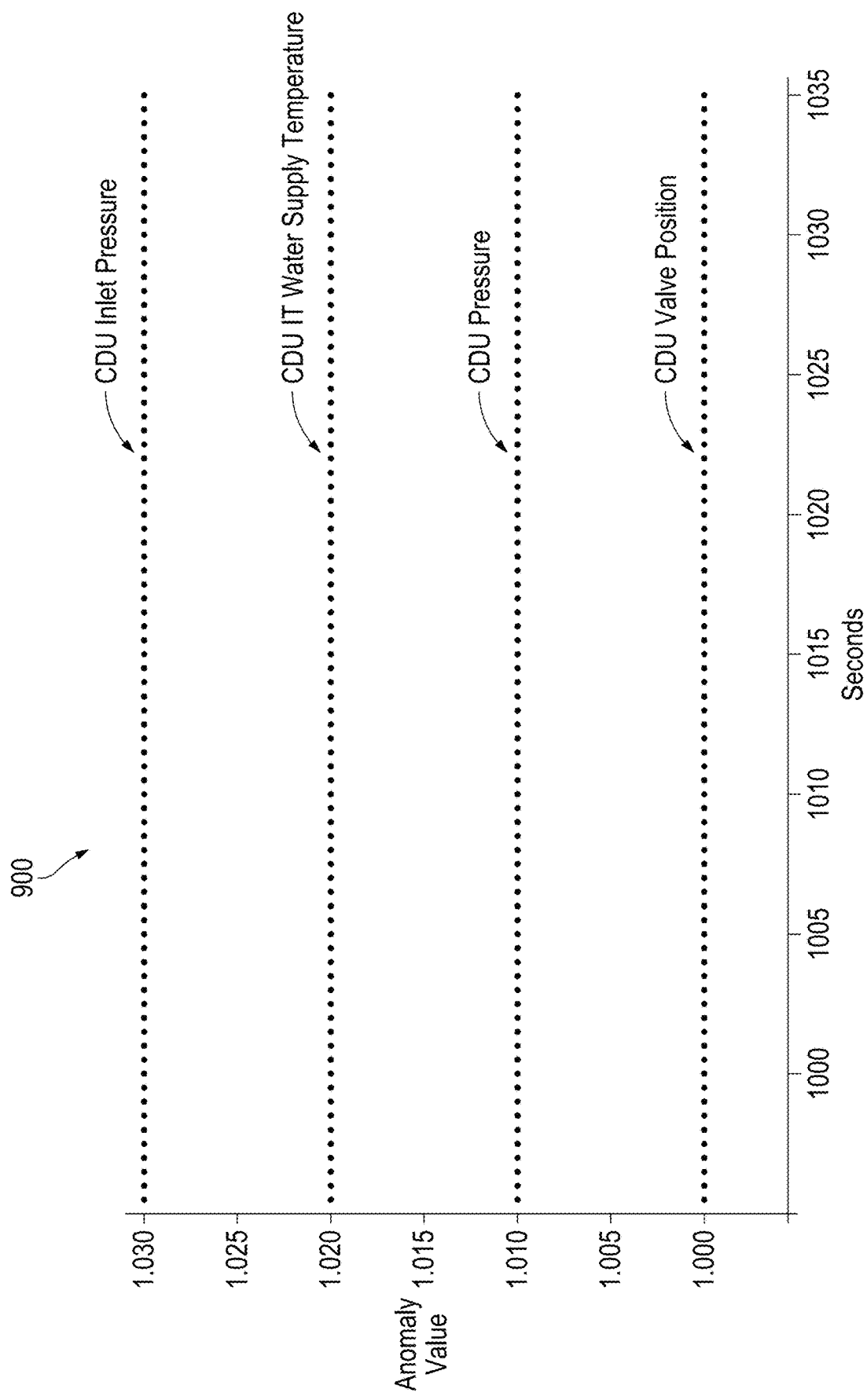
FIG. 9 is a chart illustrating an exemplary embodiment of outputs of the model resulting in anomalies.

FIG. 9 is a chart 900 illustrating an exemplary embodiment of outputs of the model resulting in anomalies. The anomalies are represented by anomaly values over 1.0. As can be seen in FIG. 9, in some embodiments, the neural network 800, when deployed, identifies anomalies for the CDU valve position (409-2), CDU IT water supply temperature (407-2), CDU pressure (405-2) and CDU inlet pressure (405-3). Notably, in some embodiments, anomalies or failures can be triggered (based on the hidden state of the nodes), as shown in FIG. 6, even when the observable output values of these systems, sub-systems, sensors and/or parameters are "normal" (e.g., not exceeding thresholds). Notably, by virtue of the example embodiments described herein, failures or anomalies can be detected throughout the data center even when individual or groups of systems, sub-systems, sensors and/or parameters thereof are not failing (e.g., they are not beyond set threshold limits). For example, in FIG. 4, the closure of the facility valves 401-1 and 401-3 triggered a downstream failure or anomaly of the CDU valve position 409-2 despite the fact that no individual system, sub-system or sensor was failing or anomalous (e.g., exceeding threshold limits). Instead, the non-anomalous conditions of groups of systems or sub-systems (e.g., closure of both the valve 401-1 and 401-2) can cause the anomaly or failure.

The invention claimed is:

1. An apparatus comprising,
one or more processors, and
at least one memory communicatively coupled to the one or more processors, the at least one memory storing machine readable instructions that, when executed by the one or more processors, cause the one or more processors to:
receive historical data corresponding to a data center, the data center including a plurality of systems, a portion of the plurality of systems being housed in one or more facilities of the data center;
generate a representation of the data center, the data center representation being one or more of a schematic and a collection of data from among the historical data;
encode the data center representation into a neural network model;
train the neural network model using at least a portion of the historical data; and
deploy the trained model using a first set of inputs, causing the model to generate one or more output values for managing or optimizing the data center,
wherein the historical data includes values of parameters defining one or more of the data center, the facilities of the data center, the systems of the data center and an environment of the data center, each of the values in the historical data being associated with a corresponding time instance,
wherein the historical data includes sensor data output by one or more sensors, the one or more sensors being associated with the data center, the facilities, the systems and/or the environment,
wherein at least a portion of the systems are not equipped with sensors, and
wherein the data center representation is a graph, the graph including:
a plurality of graph nodes each of which represents (i) one of the systems, the facility or the environment of the data center; or (ii) a parameter of the data center, the systems, the facilities or the environment; and
a plurality of edges each connecting one or two of the graph nodes, each of the edges representing a relationship between the one or two of the graph nodes connected by the edge.

2. The apparatus of claim 1,
wherein the neural network includes at least a first layer and a second layer, and
wherein the encoding of the graph into the neural network model comprises:
providing, in the first layer of the neural network, a network node corresponding to each of the graph nodes in the graph;
providing, in the second layer immediately subsequent to the first layer, a network node corresponding to each of the graph nodes in the graph; and
connecting network nodes in the first layer to network nodes in the second layer based on the plurality of edges of the graph.

3. The apparatus of claim 2,
wherein the neural network further includes a third layer, and
wherein the encoding of the graph into the neural network model comprises:
providing, in the third layer of the neural network, a network node corresponding to each of the graph nodes in the graph; and
connecting network nodes in the second layer to network nodes in the third layer, based on the plurality of edges of the graph,
wherein at least one of the connections between the network nodes of the second layer to the network nodes of the third layer are different than the connections between the network nodes of the first layer and the network nodes of the second layer.

4. The apparatus of claim 3, wherein the training of the neural network model is performed using a training data set selected from the historical data based on the representation of the network nodes of the first layer.

5. The apparatus of claim 4, wherein the training of the neural network includes assigning weights to each of the connections between the network nodes in the neural network.

6. The apparatus of claim 5, wherein the deploying the trained model includes:
- inputting the first set of inputs into the neural network model, the first set of inputs being hypothetical values of parameters;
- processing the first set of inputs, thereby simulating operation of portions of the data center represented by the graph nodes encoded in the neural network, wherein the processing causes each of the network nodes to generate an output value including at least one of an observable output value and a hidden state value; and
- outputting, by each of the network nodes in a last layer of the neural network, the output value.

7. The apparatus of claim 6, wherein the trained model is redeployed one or more times based, each redeployment using a new set of inputs that are different than the first set of inputs.

8. The apparatus of claim 7, wherein the redeployment of the model is configured to maximize or minimize an objective function.

9. The apparatus of claim 8, wherein the objective function can be (i) a function of one or more of data center resiliency, thermal efficiency, power efficiency and/or cost; or (ii) a function of the severity of one or more failures, the likelihood of occurrence of the one or more failures, and the detectability of the one or more failures.

10. A computer implemented method, comprising:
- receiving historical data corresponding to a data center, the data center including a plurality of systems, a portion of the plurality of systems being housed in one or more facilities of the data center;
- generating a data center representation of the data center, the data center representation being one or more of a schematic and a collection of data from among the historical data;
- encoding the data center representation into a neural network model;
- training the neural network model using at least a portion of the historical data; and
- deploying the trained model using a first set of inputs, causing the model to generate one or more output values for managing or optimizing the data center,
- wherein the historical data includes values of parameters defining one or more of the data center, the facilities of the data center, the systems of the data center and an environment of the data center, each of the values in the historical data being associated with a corresponding time instance,
- wherein the historical data includes sensor data output by one or more sensors, the one or more sensors being associated with the data center, the facilities, the systems and/or the environment,
- wherein at least a portion of the systems are not equipped with sensors, and
- wherein the data center representation is a graph, the graph including:
  - a plurality of graph nodes each of which represents (i) one of the systems, the facility or the environment of the data center; or (ii) a parameter of the data center, the systems, the facilities or the environment; and
  - a plurality of edges each connecting one or two of the graph nodes, each of the edges representing a relationship between the one or two of the graph nodes connected by the edge.

11. The computer implemented method of claim 10,
wherein the neural network includes at least a first layer and a second layer, and
wherein the encoding of the graph into the neural network model comprises:
- providing, in the first layer of the neural network, a network node corresponding to each of the graph nodes in the graph;
- providing, in the second layer immediately subsequent to the first layer, a network node corresponding to each of the graph nodes in the graph; and
- connecting network nodes in the first layer to network nodes in the second layer based on the plurality of edges of the graph.

12. The computer implemented method of claim 11,
wherein the neural network further includes a third layer, and
wherein the encoding of the graph into the neural network model comprises:
- providing, in the third layer of the neural network, a network node corresponding to each of the graph nodes in the graph; and
- connecting network nodes in the second layer to network nodes in the third layer, based on the plurality of edges of the graph,
- wherein at least one of the connections between the network nodes of the second layer to the network nodes of the third layer are different than the connections between the network nodes of the first layer and the network nodes of the second layer.

13. The computer implemented method of claim 12, wherein the training of the neural network model is performed using a training data set selected from the historical data based on the representation of the network nodes of the first layer.

14. The computer implemented method of claim 13, wherein the training of the neural network includes assigning weights to each of the connections between the network nodes in the neural network.

15. The computer implemented method of claim 14, wherein deploying the trained model includes:
- inputting the first set of inputs into the neural network model, the first set of inputs being hypothetical values of parameters;
- processing the first set of inputs, thereby simulating operation of portions of the data center represented by the graph nodes encoded in the neural network, wherein the processing causes each of the network nodes to generate an output value including at least one of an observable output value and a hidden state value; and
- outputting, by each of the network nodes in a last layer of the neural network, the output value.

16. The computer implemented method of claim 15,
wherein the trained model is redeployed one or more times, each redeployment using a new set of inputs that are different than the first set of inputs.

17. The computer implemented method of claim 16,
wherein the redeployment of the model is configured to maximize or minimize an objective function,
wherein the objective function can be (i) a function of one or more of data center resiliency, thermal efficiency, power efficiency and/or cost; or (ii) a function of the severity of one or more failures, the likelihood of occurrence of the one or more failures, and the detectability of the one or more failures.

* * * * *